United States Patent
Kim (10) Patent No.: US 11,905,200 B2
(45) Date of Patent: Feb. 20, 2024

(54) METHOD OF MANUFACTURING WINDOW-GLASS HAVING PRINT PATTERN FOR SMARTPHONE CAMERA

(71) Applicant: JINWOO ENGINEERING CO., LTD, Hwaseong-si (KR)

(72) Inventor: Tae Hwan Kim, Hwaseong-si (KR)

(73) Assignee: JINWOO ENGINEERING CO., LTD, Hwaseong-si (KR)

(*) Notice: Subject to any disclaimer, the term of this patent is extended or adjusted under 35 U.S.C. 154(b) by 535 days.

(21) Appl. No.: 17/194,603

(22) Filed: Mar. 8, 2021

(65) Prior Publication Data

US 2022/0281768 A1    Sep. 8, 2022

(51) Int. Cl.
| | |
|---|---|
| *C03C 15/00* | (2006.01) |
| *C03B 33/033* | (2006.01) |
| *C03B 33/09* | (2006.01) |
| *C03C 17/42* | (2006.01) |

(52) U.S. Cl.
CPC ............ *C03C 15/00* (2013.01); *C03B 33/033* (2013.01); *C03B 33/091* (2013.01); *C03C 17/42* (2013.01); *C03C 2217/734* (2013.01); *C03C 2218/151* (2013.01)

(58) Field of Classification Search
None
See application file for complete search history.

(56) References Cited

U.S. PATENT DOCUMENTS

2017/0297952 A1 * 10/2017 Park .................. C03C 15/00

OTHER PUBLICATIONS

CN 105948520 machine translation, Cai et al., A 3D Glass Cover Plate and Manufacturing Method, Sep. 2016 (Year: 2016).*
KR 20170027066 machine translation, Choi et al., Method of Producing Protect Glass, Mar. 2017 (Year: 2017).*

* cited by examiner

*Primary Examiner* — Queenie S Dehghan
(74) *Attorney, Agent, or Firm* — LEX IP MEISTER, PLLC (57) ABSTRACT

The present invention relates to a method of manufacturing a window-glass having a print pattern for a smartphone camera, and has an object of enabling various patterns such as rings, dots, curves, and designs to be implemented within the printable extent on a window-glass for a camera.

That is, the present invention provides a method of manufacturing a window-glass for a smartphone camera, comprising a cell-cutting line fabrication process for forming cell-cutting lines on a glass disk for cell separation, a sheet cutting process for cutting the glass disk into units of sheets consisting of a large number of glass cells by a laser, a sheet tempering process for increasing a surface stress of a glass sheet by potassium nitrate and allowing the cell-cutting lines to be clearly formed, a print pattern formation process for forming a pattern on the window-glass through printing, an AR deposition process for forming an AR deposition layer to increase transmittance and reduce reflectance in a rear transmission area of each glass cell, an AF deposition process for forming an AF deposition layer on a front portion of each glass cell to prevent fingerprint and foreign matter contamination, and a cell separation process for separating cells along the cell-cutting lines by pushing the glass cells in units of sheets up or down.

Therefore, the present invention has an effect of enabling various patterns such as rings, dots, curves, and designs to be implemented within the printable extent on a window-glass for a camera.

5 Claims, 7 Drawing Sheets

METHOD OF MANUFACTURING WINDOW-GLASS HAVING PRINT PATTERN FOR SMARTPHONE CAMERA

FIELD OF THE DISCLOSURE

The present invention relates to a method of manufacturing a window-glass having a print pattern for a smartphone camera, and more particularly, to a method of manufacturing a window-glass for a smartphone camera, comprising a cell-cutting line fabrication process for forming cell-cutting lines on a glass disk for cell separation, a sheet cutting process for cutting the glass disk into units of sheets consisting of a large number of glass cells by a laser, a sheet tempering process for increasing a surface stress of a glass sheet by potassium nitrate and allowing the cell-cutting lines to be clearly formed, a print pattern formation process for forming a pattern on the window-glass through printing, an AR deposition process for forming an AR deposition layer to increase transmittance and reduce reflectance in a rear transmission area of each glass cell, an AF deposition process for forming an AF deposition layer on a front portion of each glass cell to prevent fingerprint and foreign matter contamination, and a cell separation process for separating cells along the cell-cutting lines by pushing the glass cells in units of sheets up or down, and has an object of enabling various patterns such as rings, dots, curves, and designs to be implemented within the printable extent on a window-glass for a camera.

BACKGROUND

In general, a camera for a smartphone is provided with a window-glass for protecting the lens of the camera on the front side.

The camera window protects the window-glass while maximizing the light transmittance through the lens of the smartphone camera.

On the other hand, in order to improve decorativeness, the camera window-glass as described above enhances decorativeness by forming a pattern on one surface of the window-glass disk through etching work.

However, the conventional window-glass for a smartphone camera as described above had a problem that patterns are formed by etching work and thus, the shape and form of the patterns are simple, resulting in its decorativeness and design quality being inferior.

PRIOR ART LITERATURE

Patent Documents (Patent Document 1) Korean Patent No. 10-1948473

SUMMARY OF THE INVENTION

Technical Objects

Thus, the present invention is designed to solve the problem of the conventional window-glass for a smartphone camera as described above that patterns are formed by etching work and thus, the shape and form of the patterns are simple, resulting in its decorativeness and design quality being inferior.

Technical Solution

Here, the present invention provides a method of manufacturing a window-glass for a smartphone camera, comprising a cell-cutting line fabrication process for forming cell-cutting lines on a glass disk for cell separation, a sheet cutting process for cutting the glass disk into units of sheets consisting of a large number of glass cells by a laser, a sheet tempering process for increasing a surface stress of a glass sheet by potassium nitrate and allowing the cell-cutting lines to be clearly formed, a print pattern formation process for forming a pattern on the window-glass through printing, an AR deposition process for forming an AR deposition layer to increase transmittance and reduce reflectance in a rear transmission area of each glass cell, an AF deposition process for forming an AF deposition layer on a front portion of each glass cell to prevent fingerprint and foreign matter contamination, and a cell separation process for separating cells along the cell-cutting lines by pushing the glass cells in units of sheets up or down.

Effects of the Invention

Therefore, the present invention comprises a cell-cutting line fabrication process for forming cell-cutting lines on a glass disk for cell separation, a sheet cutting process for cutting the glass disk into units of sheets consisting of a large number of glass cells by a laser, a sheet tempering process for increasing a surface stress of a glass sheet by potassium nitrate and allowing the cell-cutting lines to be clearly formed, a print pattern formation process for forming a pattern on the window-glass through printing, an AR deposition process for forming an AR deposition layer to increase transmittance and reduce reflectance in a rear transmission area of each glass cell, an AF deposition process for forming an AF deposition layer on a front portion of each glass cell to prevent fingerprint and foreign matter contamination, and a cell separation process for separating cells along the cell-cutting lines by pushing the glass cells in units of sheets up or down, and thereby, has an effect of enabling various patterns such as rings, dots, curves, and designs to be implemented within the printable extent on a window-glass for a camera.

DETAILED DESCRIPTION OF THE PREFERRED EMBODIMENTS

Hereinafter, the detailed description will be as follows with reference to the accompanying drawings.

The present invention is designed to enable various patterns such as rings, dots, curves, and designs to be implemented within the printable extent on a window-glass for a camera, and the terms or words used in the present description and the claims should not be construed as limited to their ordinary or lexical meanings, but should be construed as the meaning and concept in line with the technical idea of the present invention based on the principle that the inventor can appropriately define the concept of terms in order to describe his own invention in the best possible way.

Accordingly, since the embodiments described herein and the configurations illustrated in the drawings are merely one of the most preferred embodiments of the present invention and do not represent all the technical ideas of the present invention, it should be understood that there may be various equivalents and variations that can replace them at the time of filing this application.

Figure 1:
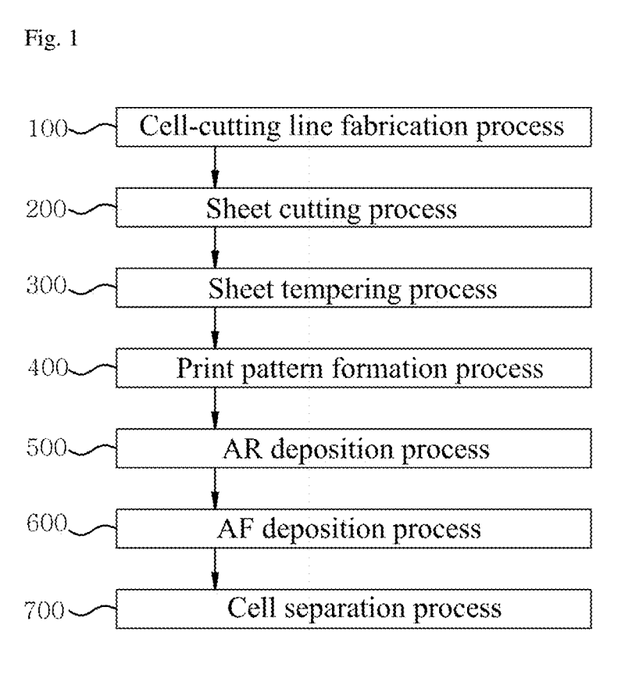
FIG. 1 is a schematic view showing a method of manufacturing a window-glass having a print pattern for a smartphone camera in accordance with an embodiment of the present invention.

Thus, the present invention relates to a method of manufacturing a window-glass for a smartphone camera, comprising a cell-cutting line fabrication process 100, a sheet cutting process 200, a sheet tempering process 300, a print pattern formation process 400, an AR deposition process 500, an AF deposition process 600, and a cell separation process 700.

Figure 2:
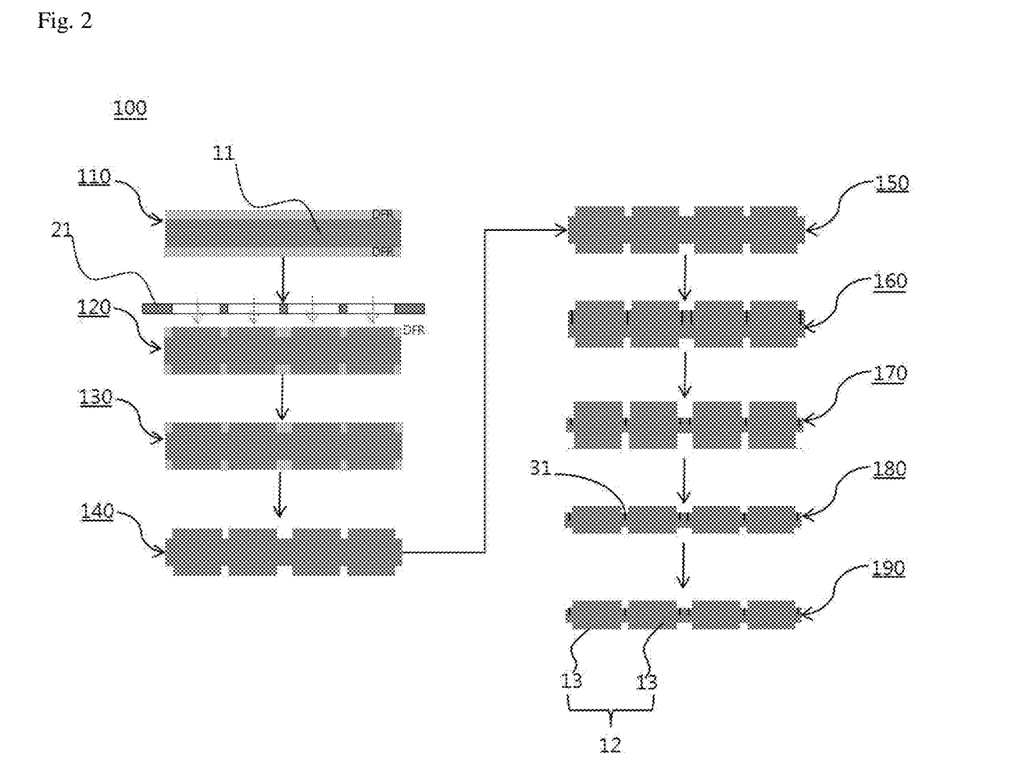
FIG. 2 is a diagram showing a process of fabricating cell-cutting lines of a method of manufacturing a window-glass having a print pattern for a smartphone camera in accordance with an embodiment of the present invention.

Here, the cell-cutting line fabrication process 100 is to form cell-cutting lines 31 on a glass disk 11 for cell separation.

The cell-cutting line fabrication process 100 comprises: a cell-cutting DFR double-side lamination step 110 for laminating a dry film photoresist (DFR) that is developed so that only a portion with cell-cutting lines 31 formed thereon of a glass disk 11 is exposed by photoreaction on both sides of the glass disk 11; a cell-cutting exposure step 120 for irradiating ultraviolet rays by way of a photomask 21 according to the cell-cutting lines 31 designed on both of upper and lower surfaces of the glass disk 11 laminated with the DFR through the cell-cutting DFR double-side lamination step 110; a cell-cutting pre-bake step 130 for pressing and close-contacting to prevent the DFR from being lifted during a development and etching process by making the DFR closely contact with the glass disk 11; a cell-cutting development step 140 for removing the DFR, by development, that has not been exposed to the ultraviolet rays through the cell-cutting exposure step 120; a cell-cutting hard-break step 150 for pressing the DFR weakened by the development through the cell-cutting development step into close contact with the glass disk 11; a laser cell-cutting line fabrication step 160 for forming cell-cutting lines having a predetermined depth with a laser on a surface for formation of the cell-cutting lines 31 of the glass disk 11 exposed through the cell-cutting development step 140; a cell-cutting glass etching step 170 for forming cell-cutting grooves by corroding with an etching solution a surface on which the cell-cutting lines 31 are formed, which are exposed through the laser cell-cutting line fabrication step 160; a cell-cutting DFR peeling step 180 for removing, with a peeling solution, the DFR remaining on the glass disk 11 after the cell-cutting glass etching step 170; and a cell-cutting healing step 190 for homogenizing surfaces by completely etching the glass disk 11 within 2 minutes in an etching solution of low-concentration.

The glass disk 11 uses a half-tempered glass disk 11 that is tempered to have a surface stress of 500 to 600 MPa, a tempered depth of 10 to 30 μm, and a central stress of 50 to 90 MPa through a preheating process using hot air at 250±20° C. for 30 min±10 min, then a main heating process in KNO3 (potassium nitrate) at 420±20° C. for 100 min±20 min, and then a process of slow cooling using hot water at 150±20° C. for 15 minutes±5 minutes.

Using the half-tempered glass disk 11 as described above can prevent a depth variation in an etching pattern and over-etching due to variation in reaction during pattern etching so as to avoid occurrences of breakage, chipping, and scratching in handling between processes.

In implementing the cell-cutting DFR double-side lamination step 110, an implementation is preferred to use a medium-sensitivity DFR for the upper surface and a low-sensitivity DFR for the lower surface, so as to prevent excessive exposure of a lower DFR layer that is subject to continuous exposure in the cell-cutting exposure step that is the subsequent step.

The cell-cutting pre-bake step 130 is to dry and stabilize the DFR layer, which has been lifted in the cell-cutting exposure step 120, by drying at a temperature of 100 to 120° C. for 10 to 20 minutes.

The cell-cutting hard-break step 150 is to press, dry, and stabilize the DFR layer, which has been lifted in the cell-cutting development step 140, by pressing and drying the DFR layer at a temperature of 120 to 150° C. for 40 to 60 minutes.

The cell-cutting glass etching step 170 is to form the cell-cutting grooves by etching for 200 to 350 seconds in a hydrofluoric acid etching solution prepared by mixing a hydrofluoric acid mixture in an amount of 25 to 50% by weight.

The cell-cutting healing step 190 is for healing and etching an entire surface of the glass disk 11 in a low hydrofluoric acid etching solution prepared by mixing a hydrofluoric acid mixture in an amount of 3 to 15% by weight, so as to increase strength and improve an exterior quality by improving coarseness of an etching area formed coarsely in the cell-cutting glass etching step 170.

In addition, the sheet cutting process 200 is to cut the glass disk 11 into units of sheets consisting of a large number of glass cells 13 by a laser.

Further, the sheet tempering process 300 is to increase a surface stress of a glass sheet 12 by potassium nitrate and to allow the cell-cutting lines 31 to be clearly formed through the change in the surface stress.

The sheet tempering process 300 comprises a process of preheating for 20 to 40 minutes in hot air of 250 to 310° C., tempering for 120 to 170 minutes by immersing in potassium nitrate tempering solution of 390 to 450° C., and, slowly cooling in a fluid for 10 to 20 minutes at a temperature of 100 to 170° C., tempers to have a surface stress of 650 to 850 MPa, a tempered depth of 30 to 45 μm, and a central stress of 100 to 130 MPa, and couples each of the glass cells 13 in a meshed state that are cut into cells by the cell-cutting lines 31 formed by etching according to the change in the surface stress of the glass sheet 12.

Figure 3:
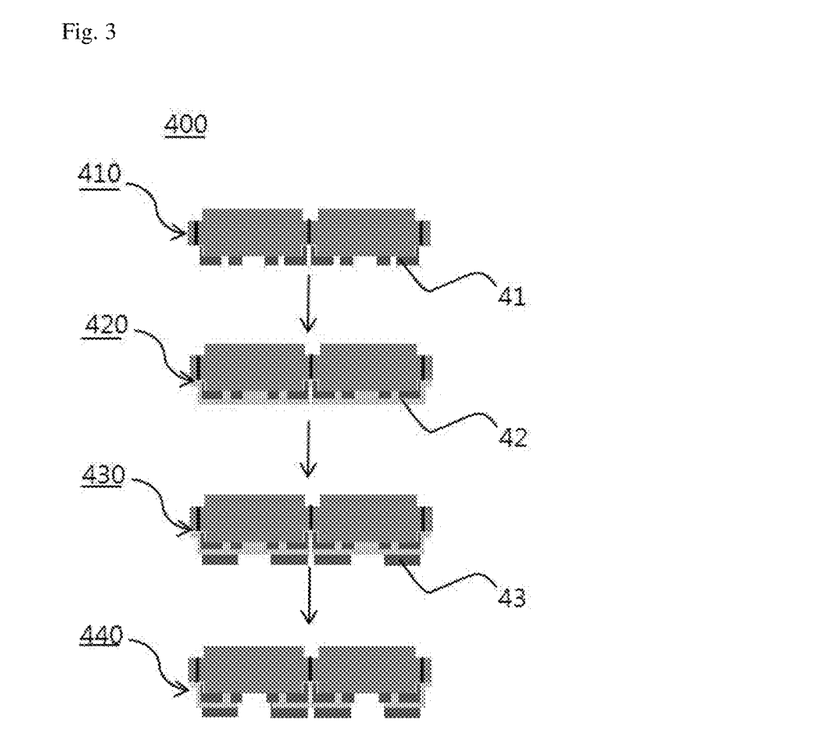
FIG. 3 is a diagram showing a process of a print pattern type of a method of manufacturing a window-glass having a print pattern for a smartphone camera in accordance with an embodiment of the present invention.

Moreover, the print pattern formation process 400 is to form a pattern on the window-glass through printing.

The print pattern formation process 400 comprises: a pattern printing step 410 for forming a print pattern layer by printing a pattern with a thermosetting color ink on a back surface of the glass sheet 12 with a print mask having a print pattern formed thereon, a print multi-deposition step 420 for forming a pattern multi-deposition layer 42 on an upper surface of the print pattern layer of the glass sheet 12 after the pattern printing step 410, a base printing step 430 for forming a base print layer 43 on an upper surface of the multi-deposition layer except for a central transmission area of the glass cell 13 through which light is transmitted, and a pattern multi-etching step 440 for removing by etching the pattern multi-deposition layer 42 formed in the central transmission area of the glass cell 13 on which the base print layer 43 is not formed through the base printing step 430.

The pattern printing step 410 is performed by printing a thermosetting black or color ink using the print mask and drying with hot air of 100 to 150° C. for 30 to 60 minutes, and the print mask is made of a stainless print mask for dimensional stability and for a pattern-printed portion and a pattern non-printed portion of the glass sheet 12 to be clearly separately formed.

The print multi-deposition step 420 is to deposit high refractive and low refractive materials such as Al2o3, Tio2, Ti3o5, Indium, and Nb2o5 in multi-layers, thereby improving the luminance (brightness) of the pattern print layer 41 and implementing various colors.

The base printing step 430 is to form the base print layer 43 by printing a thermosetting black or color ink and drying with hot air of 100 to 150° C. for 30 to 60 minutes, and an outer edge of the base print layer 43 is formed to be 0.2 mm smaller inward than an edge of the glass cell 13 to be separately formed.

The pattern multi-etching step 440 is to remove by etching multi-layers formed on a portion where the base print layer 43 is not formed by corroding in an alkaline etching solution of 40 to 70° C. for 5 to 10 minutes, and the alkaline etching solution is formed to have an acidity of Ph 12.0 or higher so as not to damage surfaces of the glass sheet 12.

Figure 7:
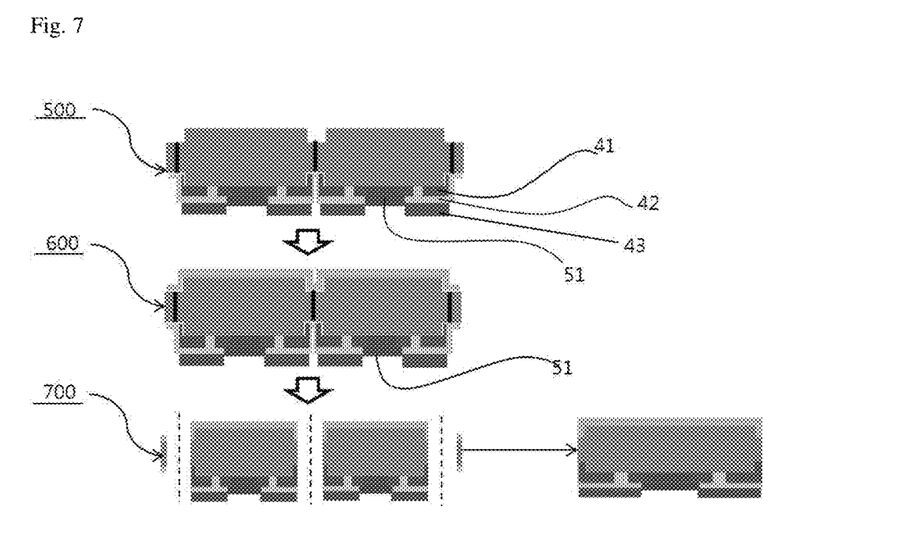
FIG. 7 is a diagram showing a product through AR and AF deposition of a method of manufacturing a window-glass having a print pattern for a smartphone camera in accordance with an embodiment of the present invention.
Figure 8:
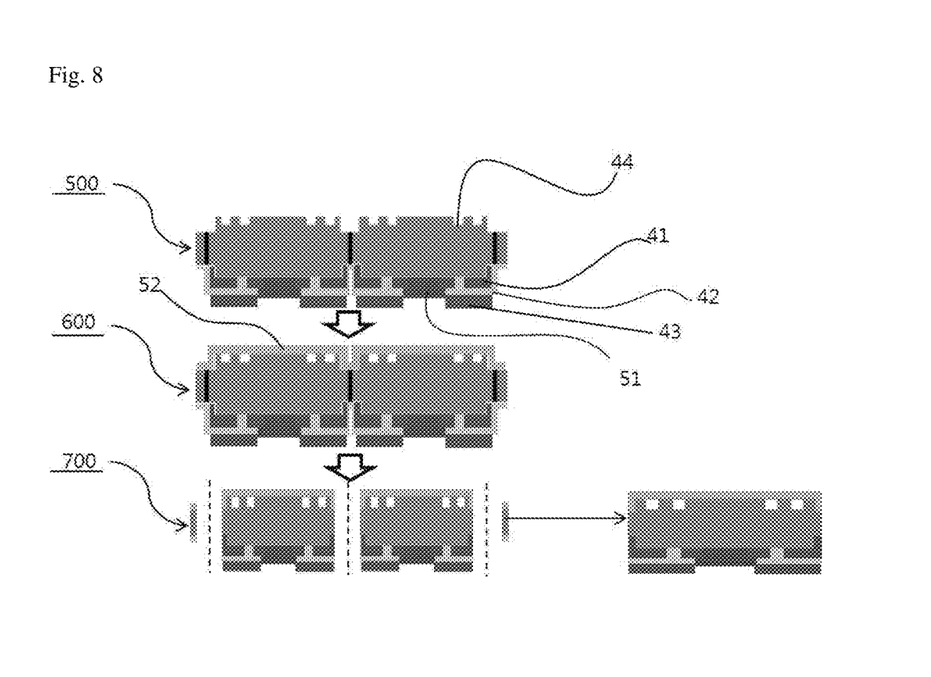
FIG. 8 is a diagram showing a product through AR and AF deposition of a method of manufacturing a window-glass having a print pattern for a smartphone camera in accordance with another embodiment of the present invention.

In addition, the AR deposition process 500 is to form an AR deposition layer 51 to increase transmittance and reduce reflectance in a rear transmission area of each glass cell 13, and is to increase light transmittance in the transmission area by depositing high refractive and low refractive materials such as Al2o3, Tio2, Ti3o5, Indium, and Nb2o5 in multi-layers.

In addition, the AF deposition process 600 is to form an AF deposition layer 52 on a front portion of each glass cell 13 to prevent fingerprint and foreign matter contamination, and is carried out by applying an AF (Anti-Finger Coat) in a vacuum deposition (dry) method to a pattern surface of the front portion exposed to the outside of the glass sheet 12, coating an SIO2 material on a glass surface with 50 to 200 Å, and then coating a fluorine-based polymer with 100 to 300 Å.

In addition, the cell separation process 700 is to separate cells along the cell-cutting lines 31 by pushing the glass cells 13 in units of sheets up or down.

Figure 4:
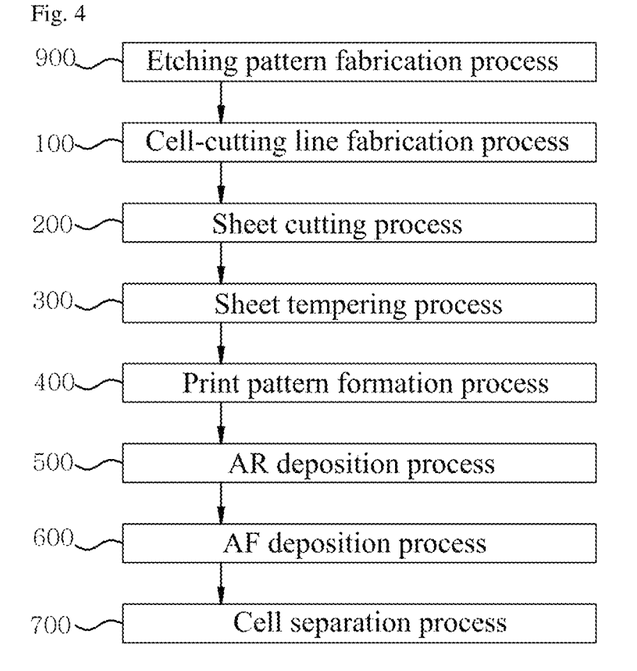
FIGS. 4 and 5 are schematic views showing a method of manufacturing a window-glass having a print pattern for a smartphone camera in accordance with another embodiment of the present invention.
Figure 5:
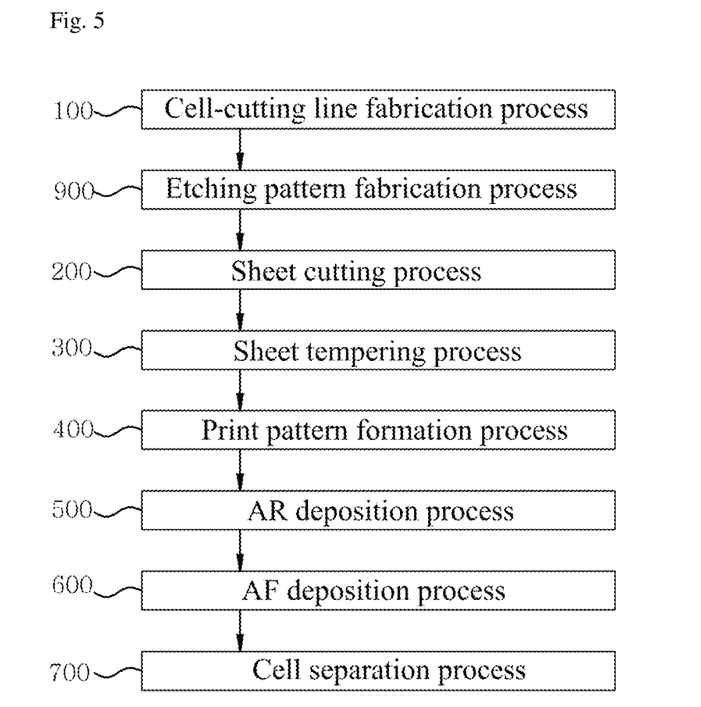

On the other hand, in an implementation of the present invention, an etching pattern fabrication process 900 for forming an etching pattern on the front portion of the glass cell 13 may further be carried out before or after the cell-cutting line fabrication process 100.

Figure 6:
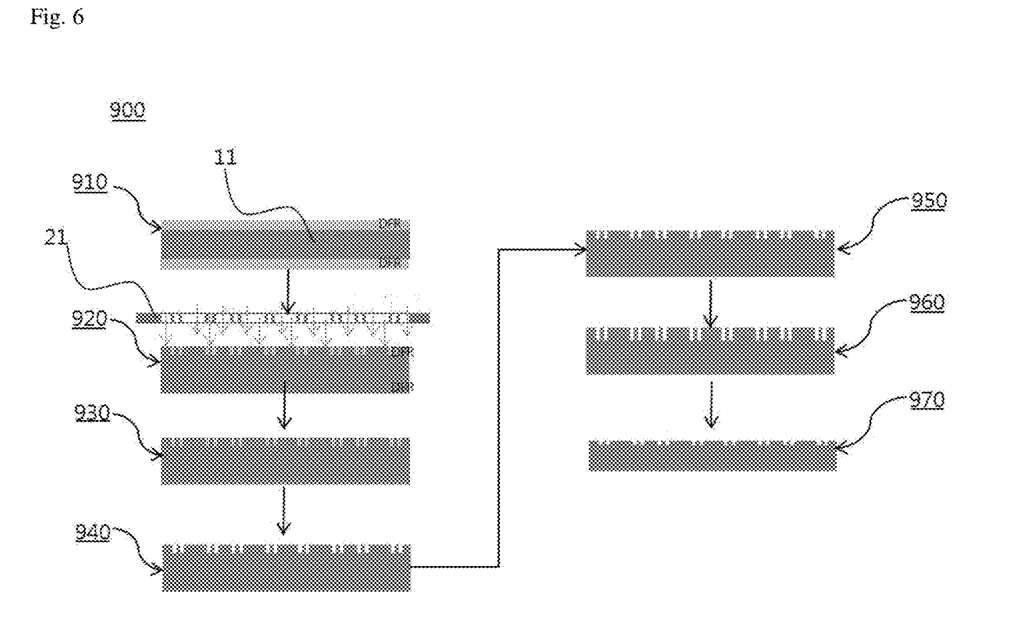
FIG. 6 is a diagram showing a process of fabricating an etching pattern of a method of manufacturing a window-glass having a print pattern for a smartphone camera in accordance with another embodiment of the present invention.

The etching pattern fabrication process 900 comprises: an etching pattern DFR double-side lamination step 910 for laminating a dry film photoresist (DFR) that is developed so that only a portion with an etching pattern formed thereon of the glass disk 11 is exposed by photoreaction on both sides of the glass disk 11; an etching pattern front-surface irradiation step 920 for irradiating ultraviolet rays by way of the photomask 21 according to the etching pattern designed on both of the upper and lower surfaces of the glass disk 11 laminated with the DFR through the etching pattern DFR double-side lamination step 910; an etching pattern pre-bake step 930 for pressing and close-contacting to prevent the DFR from being lifted during a development and etching process by making the DFR closely contact with the glass disk 11; an etching pattern development step 940 for removing the DFR, by development, that has not been exposed to the ultraviolet rays through the etching pattern front-surface irradiation step 920; an etching pattern hard-break step 950 for pressing the DFR weakened by the development through the etching pattern development step 940 into close contact with the glass disk 11; an etching pattern glass etching step for forming the cell-cutting lines 31 by corroding with an etching solution a surface of the glass disk 11 on which the etching pattern is formed, which is exposed through the etching pattern development step 940; and an etching pattern DFR peeling step 970 for removing, with a peeling solution, the DFR remaining on the glass disk 11 after the etching pattern glass etching step.

Hereinafter, the functional effects according to the application and implementation of the present invention will be described as follows.

As described above, if the present invention is implemented by applying a method of manufacturing a window-glass for a smartphone camera, comprising: a cell-cutting line fabrication process 100 for forming cell-cutting lines 31 on a glass disk 11 for cell separation; a sheet cutting process 200 for cutting the glass disk 11 into units of sheets consisting of a large number of glass cells 13 by a laser; a sheet tempering process 300 for increasing a surface stress of a glass sheet 12 by potassium nitrate and allowing the cell-cutting lines 31 to be clearly formed; a print pattern formation process 400 for forming a pattern on the window-glass through printing; an AR deposition process 500 for forming an AR deposition layer 51 to increase transmittance and reduce reflectance in a rear transmission area of each glass cell 13; an AF deposition process 600 for forming an AF deposition layer 52 on a front portion of each glass cell 13 to prevent fingerprint and foreign matter contamination; and a cell separation process 700 for separating cells along the cell-cutting lines 31 by pushing the glass cells 13 in units of sheets up or down, then the cell-cutting lines 31 are clearly formed through the cell-cutting line fabrication process 100 by etching, and decorativeness and commerciality are maximized through expression of various patterns and various colors through the print pattern formation process 400.

On the other hand, in an implementation of the present invention, if the cell-cutting line fabrication process 100 is implemented to comprise: a cell-cutting DFR double-side lamination step 110 for laminating a dry film photoresist (DFR) that is developed so that only a portion with cell-cutting lines 31 formed thereon of a glass disk 11 is exposed by photoreaction on both sides of the glass disk 11; a cell-cutting exposure step 120 for irradiating ultraviolet rays by way of a photomask 21 according to the cell-cutting lines 31 designed on both of upper and lower surfaces of the glass disk 11 laminated with the DFR through the cell-cutting DFR double-side lamination step 110; a cell-cutting pre-bake step 130 for pressing and close-contacting to prevent the DFR from being lifted during a development and etching process by making the DFR closely contact with the glass disk 11; a cell-cutting development step 140 for removing the DFR, by development, that has not been exposed to the ultraviolet rays through the cell-cutting exposure step 120; a cell-cutting hard-break step 150 for pressing the DFR weakened by the development through the cell-cutting development step into close contact with the glass disk 11; a laser cell-cutting line fabrication step 160 for forming cell-cutting lines having a predetermined depth with a laser on a surface for formation of the cell-cutting lines 31 of the glass disk 11 exposed through the cell-cutting development step 140; a cell-cutting glass etching step 170 for forming cell-cutting grooves by corroding with an etching solution a surface on which the cell-cutting lines 31 are formed, which are exposed through the laser cell-cutting line fabrication step 160; a cell-cutting DFR peeling step 180 for removing, with a peeling solution, the DFR remaining on the glass disk 11 after the cell-cutting glass etching step 170; and a cell-cutting healing step 190 for homogenizing surfaces by completely etching the glass disk 11 within 2 minutes in an etching solution of low-concentration, then the DFRs on the front and back surfaces are implemented with different sensitivities in the cell-cutting DFR double-side lamination step 110, and the cell-cutting exposure step 120 is carried out by adjusting the intensity of exposure, so as to prevent damage due to excessive exposure of the DFR layer of the front portion of the glass disk 11, which has been previously exposed, and etching defects resulting therefrom.

In addition, as the adhesion of the DFR layer to the glass sheet 12 is maintained through the cell-cutting pre-bake step 130 and the cell-cutting hard-break step 150, clear cell-cutting lines 31 are formed in the cell-cutting glass etching step 170.

Moreover, since the entire glass disk 11 is surface-etched with the etching solution of low-concentration through the cell-cutting healing step 190 to stabilize the coarse surface, the strength and light transmittance of the glass disk 11 are maximized.

Furthermore, in an implementation of the present invention, if the print pattern formation process 400 is implemented to comprise: a pattern printing step 410 for forming a print pattern layer by printing a pattern with a thermosetting color ink on a back surface of the glass sheet 12 with a print mask having a print pattern formed thereon; a print multi-deposition step 420 for forming a pattern multi-deposition layer 42 on an upper surface of the print pattern layer of the glass sheet 12 after the pattern printing step 410; a base printing step 430 for forming a base print layer 43 on an upper surface of the multi-deposition layer except for a central transmission area of the glass cell 13 through which light is transmitted; and a pattern multi-etching step 440 for removing by etching the pattern multi-deposition layer 42 formed in the central transmission area of the glass cell 13 on which the base print layer 43 is not formed through the base printing step 430, then the pattern multi-deposition layer 42 is formed on the print pattern layer through the print multi-deposition step 420 and the base print layer 43 is formed on top of that through the base printing step 430, so that the print pattern layer formed on the rear surface of the glass cell 13 is seen through clearly and transparently.

On the other hand, forming the base print layer 43, which is formed through the base printing step 430, to be narrower than the edge of the glass cell 13 formed allows the pattern of the print pattern layer to be expressed more clearly by an edge effect.

Further, in an implementation of the present invention, if the sheet tempering process 300 comprising a process of preheating for 20 to 40 minutes in hot air of 250 to 310° C., tempering for 120 to 170 minutes by immersing in potassium nitrate tempering solution of 390 to 450° C., and slowly cooling in a fluid for 10 to 20 minutes at a temperature of 100 to 170° C. is implemented, the glass sheet 12 is tempered to have a surface stress of 650 to 850 MPa, a tempered depth of 30 to 45 μm, and a central stress of 100 to 130 MPa, and the cell-cutting lines 31 are clearly formed.

Also, the etching pattern fabrication process 900 is further implemented as in other embodiments of the present invention, and if the etching pattern fabrication process 900 is implemented to comprise: an etching pattern DFR double-side lamination step 910 for laminating a dry film photoresist (DFR) that is developed so that only a portion with an etching pattern formed thereon of the glass disk 11 is exposed by photoreaction on both sides of the glass disk 11; an etching pattern front-surface irradiation step 920 for irradiating ultraviolet rays by way of the photomask 21 according to the etching pattern designed on both of the upper and lower surfaces of the glass disk 11 laminated with the DFR through the etching pattern DFR double-side lamination step 910; an etching pattern pre-bake step 930 for pressing and close-contacting to prevent the DFR from being lifted during a development and etching process by making the DFR closely contact with the glass disk 11; an etching pattern development step 940 for removing the DFR, by development, that has not been exposed to the ultraviolet rays through the etching pattern front-surface irradiation step 920; an etching pattern hard-break step 950 for pressing the DFR weakened by the development through the etching pattern development step 940 into close contact with the glass disk 11; an etching pattern glass etching step for forming the cell-cutting lines 31 by corroding with an etching solution a surface of the glass disk 11 on which the etching pattern is formed, which is exposed through the etching pattern development step 940; and an etching pattern DFR peeling step 970 for removing, with a peeling solution, the DFR remaining on the glass disk 11 after the etching pattern glass etching step, then the etching pattern is formed on the front surface of the glass cell 13 together with the print pattern on the rear surface of the glass cell 13, resulting in the decorativeness and clarity of the pattern of the glass cell 13 being improved.

[Description of Reference Numerals and Symbols]

| | |
|---|---|
| 11: Glass disk | 12: Glass sheet |
| 13: Glass cell | 21: Photomask |
| 31: Cell-cutting lines | |
| 41: Pattern print layer | 42: Pattern multi-deposition layer |
| 43: Base print layer | 44: Pattern etching groove |
| 51: AR deposition layer | 52: AF deposition layer |
| 100: Cell-cutting line fabrication process | |
| 110: Cell-cutting DFR double-side lamination step | |
| 120: Cell-cutting exposure step | |
| 130: Cell-cutting pre-bake step | |
| 140: Cell-cutting development step | |
| 150: Cell-cutting hard-break step | |
| 160: Laser cell-cutting line fabrication step | |
| 170: Cell-cutting glass etching step | |
| 180: Cell-cutting DFR peeling step | |
| 190: Cell-cutting healing step | |
| 200: Sheet cutting process | |
| 300: Sheet tempering process | |
| 400: Print pattern formation process | |
| 410: Pattern printing step | 420: Print multi-deposition step |
| 430: Base printing step | 440: Pattern multi-etching step |

[Description of Reference Numerals and Symbols]

500: AR deposition process
600: AF deposition process
700: Cell separation process
900: Etching pattern fabrication process
910: Etching pattern DFR double-side lamination step
920: Etching pattern front-surface irradiation step
930: Etching pattern pre-bake step
940: Etching pattern development step
950: Etching pattern hard-break step
960: Etching pattern glass etching step
970: Etching pattern DFR peeling step

What is claimed is:

1. A method of manufacturing a window-glass having a print pattern for a smartphone camera, comprising:

a cell-cutting line fabrication process 100 for forming cell-cutting lines 31 on a glass disk 11 for cell separation; a sheet cutting process 200 for cutting the glass disk 11 into units of sheets consisting of a large number of glass cells 13 by a laser; a sheet tempering process 300 for increasing a surface stress of a glass sheet 12 by potassium nitrate and allowing the cell-cutting lines 31 to be clearly formed; a print pattern formation process 400 for forming a pattern on the window-glass through printing; an AR deposition process 500 for forming an AR deposition layer 51 to increase transmittance and reduce reflectance in a rear transmission area of each glass cell 13; an AF deposition process 600 for forming an AF deposition layer 52 on a front portion of each glass cell 13 to prevent fingerprint and foreign matter contamination; and a cell separation process 700 for separating cells along the cell-cutting lines 31 by pushing the glass cells 13 in units of sheets up or down, wherein the glass disk 11 uses a half-tempered glass disk 11 that is tempered to have a surface stress of 500 to 600 MPa, a tempered depth of 10 to 30 μm, and a central stress of 50 to 90 MPa through a preheating process using hot air at 250±20° C. for 30 min±10 min, then a main heating process in KNO3 (potassium nitrate) at 420±20° C. for 100 min±20 min, and then a process of slow cooling using hot water at 150±20° C. for 15 minutes±5 minutes, wherein the cell-cutting line fabrication process 100 comprises: a cell-cutting DFR double-side lamination step 110 for laminating a dry film photoresist (DFR) that is developed so that only a portion with cell-cutting lines 31 formed thereon of a glass disk 11 is exposed by photoreaction on both sides of the glass disk 11; a cell-cutting exposure step 120 for irradiating ultraviolet rays by way of a photomask 21 according to the cell-cutting lines 31 designed on both of upper and lower surfaces of the glass disk 11 laminated with the DFR through the cell-cutting DFR double-side lamination step 110; a cell-cutting pre-bake step 130 for pressing and close-contacting to prevent the DFR from being lifted during a development and etching process by making the DFR closely contact with the glass disk 11; a cell-cutting development step 140 for removing the DFR, by development, that has not been exposed to the ultraviolet rays through the cell-cutting exposure step 120; a cell-cutting hard-break step 150 for pressing the DFR weakened by the development through the cell-cutting development step into close contact with the glass disk 11; a laser cell-cutting line fabrication step 160 for forming cell-cutting lines having a predetermined depth with a laser on a surface for formation of the cell-cutting lines 31 of the glass disk 11 exposed through the cell-cutting development step 140; a cell-cutting glass etching step 170 for forming cell-cutting grooves by corroding with an etching solution a surface on which the cell-cutting lines 31 are formed, which are exposed through the laser cell-cutting line fabrication step 160; a cell-cutting DFR peeling step 180 for removing, with a peeling solution, the DFR remaining on the glass disk 11 after the cell-cutting glass etching step 170; and a cell-cutting healing step 190 for homogenizing surfaces by completely etching the glass disk 11 within 2 minutes in an etching solution of low-concentration, wherein the cell-cutting healing step 190 is performed by healing and etching an entire surface of the glass disk 11 in a low hydrofluoric acid etching solution prepared by mixing a hydrofluoric acid mixture in an amount of 3 to 15% by weight, so as to increase strength and improve an exterior quality by improving coarseness of an etching area formed coarsely in the cell-cutting glass etching step 170, wherein a medium-sensitivity DFR is used for the upper surface and a low-sensitivity DFR is used for the lower surface in the cell-cutting DFR double-side lamination step 110, so as to prevent excessive exposure of a lower DFR layer that is subject to continuous exposure in the cell-cutting exposure step that is a subsequent step, wherein an etching pattern fabrication process 900 for forming an etching pattern on the front portion of the glass cell 13 is carried out before or after the cell-cutting line fabrication process 100, and wherein the etching pattern fabrication process 900 comprises: an etching pattern DFR double-side lamination step 910 for laminating a dry film photoresist (DFR) that is developed so that only a portion with an etching pattern formed thereon of the glass disk 11 is exposed by photoreaction on both sides of the glass disk 11; an etching pattern front-surface irradiation step 920 for irradiating ultraviolet rays by way of the photomask 21 according to the etching pattern designed on both of the upper and lower surfaces of the glass disk 11 laminated with the DFR through the etching pattern DFR double-side lamination step 910; an etching pattern pre-bake step 930 for pressing and close-contacting to prevent the DFR from being lifted during a development and etching process by making the DFR closely contact with the glass disk 11; an etching pattern development step 940 for removing the DFR, by development, that has not been exposed to the ultraviolet rays through the etching pattern front-surface irradiation step 920; an etching pattern hard-break step 950 for pressing the DFR weakened by the development through the etching pattern development step 940 into close contact with the glass disk 11; an etching pattern glass etching step for forming the cell-cutting lines 31 by corroding with an etching solution a surface of the glass disk 11 on which the etching pattern is formed, which is exposed through the etching pattern development step 940; and an etching pattern DFR peeling step 970 for removing, with a peeling solution, the DFR remaining on the glass disk 11 after the etching pattern glass etching step.

2. The method of manufacturing a window-glass having a print pattern for a smartphone camera of claim 1, wherein the print pattern formation process 400 comprises: a pattern printing step 410 for forming a print pattern layer by printing a pattern with a thermosetting color ink on a back surface of the glass sheet 12 with a print mask having a print pattern formed thereon; a print multi-deposition step 420 for forming a pattern multi-deposition layer 42 on an upper surface of the print pattern layer of the glass sheet 12 after the pattern printing step 410; a base printing step 430 for forming a base print layer 43 on an upper surface of the multi-deposition layer except for a central transmission area of the glass cell 13 through which light is transmitted; and a pattern multi-etching step 440 for removing by etching the pattern multi-deposition layer 42 formed in the central transmission area of the glass cell 13 on which the base print layer 43 is not formed through the base printing step 430.

3. The method of manufacturing a window-glass having a print pattern for a smartphone camera of claim 2,
wherein the pattern printing step 410 is performed by printing a thermosetting black or color ink using the print mask and drying with hot air of 100 to 150° C. for 30 to 60 minutes, and the print mask is made of a stainless print mask for dimensional stability and for a pattern-printed portion and a pattern non-printed portion of the glass sheet 12 to be clearly separately formed.

4. The method of manufacturing a window-glass having a print pattern for a smartphone camera of claim 2,
wherein the base printing step 430 forms the base print layer 43 by printing a thermosetting black or color ink and drying with hot air of 100 to 150° C. for 30 to 60 minutes, and an outer edge of the base print layer 43 is formed to be 0.2 mm smaller inward than an edge of the glass cell 13 to be separately formed.

5. The method of manufacturing a window-glass having a print pattern for a smartphone camera of claim 2,
wherein the pattern multi-etching step 440 removes by etching multi-layers formed on a portion where the base print layer 43 is not formed by corroding in an alkaline etching solution of 40 to 70° C. for 5 to 10 minutes, and the alkaline etching solution is formed to have an acidity of Ph 12.0 or higher so as not to damage surfaces of the glass sheet 12.

* * * * *